United States Patent
Ozaki et al.

(10) Patent No.: US 6,169,635 B1
(45) Date of Patent: Jan. 2, 2001

(54) ZOOM LENS SYSTEM

(75) Inventors: Hiroyasu Ozaki, Tokyo; Takayuki Ito, Saitama-ken, both of (JP)

(73) Assignee: Asahi Kogaku Kogyo Kabushiki Kaisha, Tokyo (JP)

( * ) Notice: Under 35 U.S.C. 154(b), the term of this patent shall be extended for 0 days.

(21) Appl. No.: 09/244,076

(22) Filed: Feb. 4, 1999

(30) Foreign Application Priority Data

Feb. 5, 1998 (JP) .................................................. 10-24788

(51) Int. Cl.⁷ ................................................. G02B 15/14
(52) U.S. Cl. ............................................................ 359/691
(58) Field of Search .................................. 359/691, 689, 359/687

(56) References Cited

U.S. PATENT DOCUMENTS

| | | | |
|---|---|---|---|
| 4,168,110 | 9/1979 | Itoh | 350/184 |
| 4,838,666 * | 6/1989 | Shiraishi | 350/427 |
| 5,264,965 | 11/1993 | Hirakawa | 359/686 |
| 5,331,464 | 7/1994 | Ito et al. | 359/691 |
| 5,546,232 | 8/1996 | Hirakawa | 359/691 |
| 5,748,384 | 5/1998 | Sensui | 359/686 |
| 5,786,942 | 7/1998 | Komori et al. | 359/686 |
| 5,798,872 * | 8/1998 | Uzawa | 359/686 |
| 5,909,318 * | 6/1999 | Tanaka | 359/689 |

\* cited by examiner

*Primary Examiner*—Georgia Epps
*Assistant Examiner*—Tim Thompson
(74) *Attorney, Agent, or Firm*—Greenblum & Bernstein, P.L.C.

(57) ABSTRACT

A zoom lens system includes a negative first lens group, an aperture stop, and a positive second lens group, arranged in this order from an object side. The first and second lens groups are movable along an optical axis for zooming, while the aperture stop, which is disposed between the lens groups, stays unmoved during zooming. The zoom lens system satisfies conditions (1), (2) and (3):

$$0.7 < (f_t - f_w)/(f_i - f_w) < 1.0 \tag{1}$$

and $$0.37 < d_i/f_w \tag{2}$$

$$0.3 < f_w/f^2 < 0.7 \tag{3}$$

where $f_i$ is a focal length of the entire system when the total length of the entire system becomes shortest, $f_w$ is the shortest focal length of the entire system, $f_t$ is the longest focal length of the entire system, $d_i$ is air gap between the first lens group and the aperture stop when the total length is the shortest and $f_2$ is a focal length of the second lens group.

11 Claims, 11 Drawing Sheets

— d LINE
······ g LINE
--- C LINE

−0.05   0.05

SPHERICAL
ABERRATION
CHROMATIC
ABERRATION

LATERAL
CHROMATIC
ABERRATION

ASTIGMATISM

DISTORTION

FIG. 3A
1 : 4.6

−0.05  0.05
SPHERICAL ABERRATION
CHROMATIC ABERRATION

— d LINE
······ g LINE
--- C LINE

FIG. 3B
W : 15.2

−0.02  0.02
LATERAL CHROMATIC ABERRATION

FIG. 3C
W : 15.2

−0.05  0.05
ASTIGMATISM

−2  2
%
DISTORTION

FIG. 4A
1 : 5.2

−0.05  0.05
SPHERICAL ABERRATION
CHROMATIC ABERRATION

— d LINE
······ g LINE
--- C LINE

FIG. 4B
W : 13.7

−0.02  0.02
LATERAL CHROMATIC ABERRATION

FIG. 4C
W : 13.7

−0.05  0.05
ASTIGMATISM

−2  2
%
DISTORTION

—— d LINE
······ g LINE
--- C LINE

-0.05  0.05
SPHERICAL ABERRATION
CHROMATIC ABERRATION

FIG. 6B
W : 29.9

-0.02  0.02
LATERAL CHROMATIC ABERRATION

-0.05  0.05
ASTIGMATISM

FIG. 6D
W : 29.9

-2  2
%
DISTORTION

FIG. 7A
1 : 4.6

— d LINE
··· g LINE
- - - C LINE

-0.05  0.05
SPHERICAL ABERRATION
CHROMATIC ABERRATION

FIG. 7B
W : 14.0

-0.02  0.02
LATERAL CHROMATIC ABERRATION

-0.05  0.05
ASTIGMATISM

FIG. 7D
W : 14.0

-2    2
  %
DISTORTION

FIG. 8A
1 : 5.2

— d LINE
··· g LINE
- - - C LINE

-0.05  0.05
SPHERICAL ABERRATION
CHROMATIC ABERRATION

FIG. 8B
W : 12.6

-0.02  0.02
LATERAL CHROMATIC ABERRATION

-0.05  0.05
ASTIGMATISM

FIG. 8D
W : 12.6

-2    2
  %
DISTORTION

ZOOM LENS SYSTEM

BACKGROUND OF THE INVENTION

The present invention relates to a zoom lens system, and particularly to a zoom lens system applicable to cameras, such as digital cameras and video cameras, in which an image is formed on a solid state imaging element such as a CCD (Charge Coupled Device).

Conventionally, there has been known a two-group zoom lens system including a first lens group having negative power and a second lens group having positive power, which are arranged in this order from an object side. The first and second lens groups are movable along an optical axis for zooming.

In such a two-group zoom lens system, the second lens group moves to an object side when the focal length of the entire lens system is increased. That is, the second lens group is located at most image side position when the zoom lens system is positioned at wide extremity (i.e., when the zoom lens system has the smallest focal length), and when the focal length of the zoom lens system is to be increased, the second lens group is moved towards the object side. Further, an aperture stop of such a conventional two-group zoom lens system is provided within the second lens group or in the vicinity thereof, and moves together with the second lens group when the zooming operation is performed.

A zoom lens system for the CCD camera preferably has a telecentric property so that rays emitted from the lens system are perpendicularly incident on the CCD so that color difference is avoided. The telecentric system requires a certain amount of an exit pupil distance, which is defined as a distance from an exit pupil of the entire lens system to an image plane. Since the aperture stop moves together with the second lens group in the conventional two-group zoom lens system, the exit pupil distance decreases as the second lens group and the aperture stop move toward the image side.

However, the exit pupil distance of the conventional two-group zoom lens system is too short to have sufficient telecentric property within the entire zooming range. Lack of the telecentric property is significant especially when the conventional two-group zoom lens system is located at the wide extremity since the second lens group, together with the aperture stop, is moved to its most image side position at the wide extremity. Accordingly, the conventional two-group zoom lens system is not suitable for a CCD camera.

Further, in the conventional zoom lens system described above, since the aperture stop moves during the zooming operation, a structure of the lens barrel would be complicated, which increases the manufacturing cost.

It should be noted that, in the specification, terms "wide extremity" and "tele extremity" are used for expressing the zooming condition. When it is described that the zoom lens system is positioned to the "tele extremity", all the elements included in the zoom lens are positioned such that the zoom lens system has the greatest focal length. Similarly, when it is described that the zoom lens system is positioned to the "wide extremity", all the elements included in the zoom lens system are positioned such that the zoom lens system has the smallest focal length.

In the conventional two-group zoom lens system, when a zooming ratio exceeds two, a moving amount of the first lens group is relatively large. Therefore, the length of the entire lens system is relatively long. Further, variation of aberrations is relatively great, and accordingly, it is difficult to maintain a high optical performance in the entire zooming range.

SUMMARY OF THE INVENTION

It is therefore an object of the invention to provide an improved zoom lens system that has a zooming ratio of approximately 2.5, and has a sufficient exit pupil distance so that a sufficient telecentric property can be obtained throughout the entire zooming range.

For the above object, according to the present invention, there is provided a zoom lens system that includes:

a negative first lens group that is movable along an optical axis for zooming;

a positive second lens group that is movable along the optical axis for zooming, the positive second lens group being disposed at an image side of the negative first lens group; and an aperture stop that is disposed between the first and second lens groups, the aperture stop being fixed to keep the position thereof during zooming, wherein the following conditions (1) and (2) are satisfied, $$0.7<(f_i-f_w)/(f_t-f_w)<1.0 \tag{1}$$

$$0.37<d_i/f_w \tag{2}$$

where $f_i$ is a focal length of the entire system when the total length of the entire system becomes shortest, $f_w$ is the shortest focal length of the entire system, $f_t$ is the longest focal length of the entire system, and $d_i$ is air gap, along the optical axis, between the first lens group and the aperture stop when the total length becomes shortest.

The zoom lens system of the present invention further satisfies at least one of the following conditions (3) and (4);

$$0.3<f_w/f_2<0.7 \tag{3}$$

$$0.7<D_w/f_2<1.2 \tag{4}$$

where $f_2$ is focal length of the second lens group, $D_w$ is distance between the aperture stop and a first principal point of the second lens group at the wide extremity.

From a view point of moving loci of the lens groups, it is preferable that the first lens group is moved such that the distance between the first lens group and the aperture stop becomes the smallest at an intermediate position between the wide extremity and the tele extremity, and that the second lens group moves such that the distance between the second lens group and the aperture stop decreases gradually as the entire focal length increases.

The first lens group preferably includes at least two negative lenses and the following condition (5) is satisfied;

$$1.65<N_n \tag{5}$$

where $N_n$ is average refractive index of the negative lenses in the first lens group at d-line.

The zoom lens system of the present invention can be formed from two lens groups, while the present invention can be applied to a three-group zoom lens system that includes movable first and second lens group and a stationary third lens group disposed between the second lens group and an image plane.

DESCRIPTION OF THE EMBODIMENTS

Figure 21:
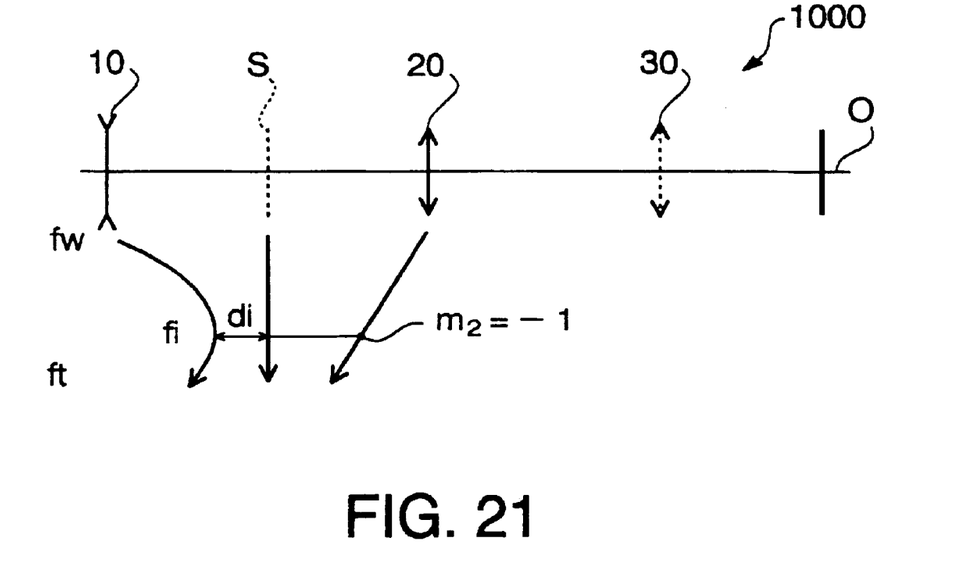
FIG. 21 schematically shows a structure of the zoom lens system, and loci of lens groups.
Figure 22:
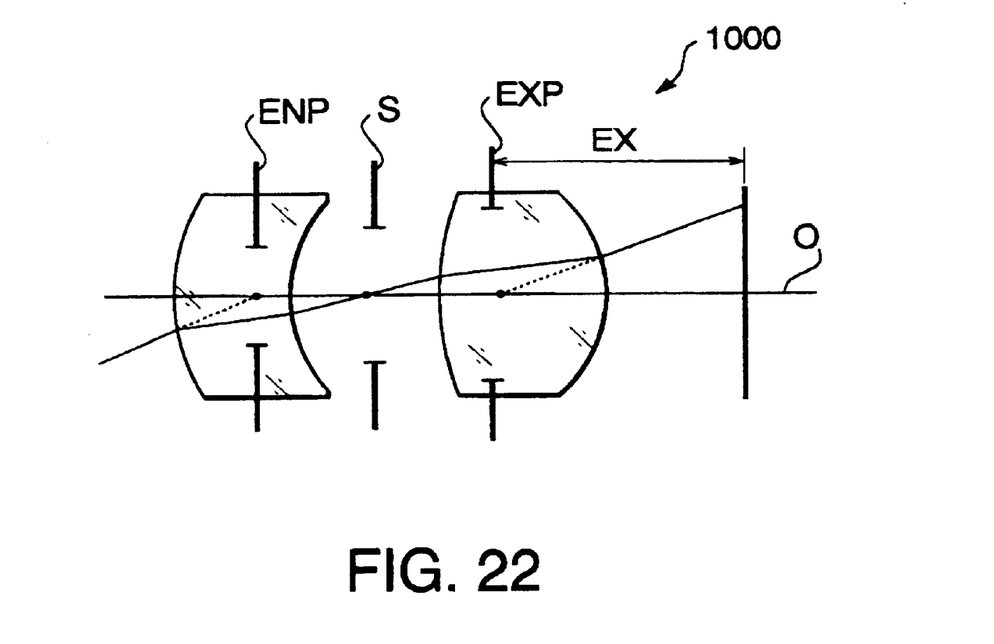
FIG. 22 is a diagram illustrating an exit pupil distance.

FIG. 21 schematically shows a structure of a zoom lens system according to an embodiment of the present invention. The zoom lens system 1000 includes a negative first lens group 10 that is movable along the optical axis O for zooming, an aperture stop S that is fixed to keep the position thereof during zooming, and a positive second lens group 20 that is movable along the optical axis O for zooming. Optionally, a third lens group 30 whose position is fixed may be provided, as indicated by broken lines, behind the second lens group 20.

The positive power of the second lens 20 is relatively great as compared with conventional two-group zoom lens systems. Accordingly, moving amount of the second lens group 20 is made relatively small. Thus, an exit pupil distance can be made sufficiently long, especially when the zoom lens system is located at a tele extremity (i.e., when the second lens group is closest to the aperture stop S). Further, the power of the second lens group 20 and position of the aperture stop are appropriately designed so as to have a telecentric property.

Furthermore, the aperture stop S is arranged at a fixed position so that the structure of a lens barrel and a lens barrel thereof are simplified.

FIG. 21 also shows loci of the lens groups of the zoom lens system 1000. When the zoom lens system 1000 is moved from the wide extremity to the tele extremity, the first lens group 10 once approaches the aperture stop S and then moves away therefrom. The distance di between the first lens group 10 and the aperture stop S becomes the smallest at an intermediate position between the wide extremity and the tele extremity. On the other hand, the second lens group 20 moves such that the distance to the aperture stop S decreases monotonically. In this lens system 1000, focusing is done by moving the first lens group 10 along the optical axis O.

It is preferable that the first lens group 10 includes at least two negative lenses in order to compensate aberrations. Further, it is preferable that the negative lens (lenses) included in the first lens group 10 has an aspherical surface whose negative power is greater at a peripheral portion than the central portion, in order to compensate a negative distortion.

The zoom lens system 1000 satisfies condition (1).

$$0.7 < (f_t - f_w)/(f_t - f_w) < 1.0 \tag{1}$$

where $f_i$ is a focal length of the entire system when the total length of the entire system becomes shortest, $f_w$ is the shortest focal length of the entire system, $f_t$ is the longest focal length of the entire system.

Condition (1) defines a relationship between the focal lengths at the wide extremity and the tele extremity, and the focal length when the total length becomes the shortest.

In the zoom lens system having a negative first lens group and a positive second lens group, when a lateral magnification $m_2$ of the second lens group equals to −1.0, the first lens group moves closest to the image, and the total length of the entire system (i.e., a distance between a first surface, or a surface closest to an object and an image plane) is the smallest.

If condition (1) is satisfied, focal lengths of the lens groups are set such that the length of the entire lens system is shortest (i.e., the lateral magnification of the second lens is one) when the zoom lens system 1000 is located at a position in the vicinity of the tele extremity. Thus, the length of the lens system can be made small, and further, imaging performance can be made high in the entire zoom range.

It should be noted that, in a zoom lens system having negative and positive lens groups in this order from the object side, $f_t = -f_1$ ($f_1$: focal length of the first lens group) when $m_2 = -1$. Further, if the zoom lens system includes a stationary third lens group, $f_t = -f_1 \times m_3$ ($m_3$: lateral magnification of the third lens group) when $m_2 = -1$. If $m_3 = +1$, then $f_i = -f_1$.

If $(f_i - f_w)/(f_t - f_w)$ exceeds the upper limit of condition (1), the lateral magnification $m_2$ of the second lens group 20 satisfies $|m_2| < 1$, and therefore, the total length of the lens system cannot be made small. Further, if the zooming ratio is increased, the moving amount of the first lens group becomes great. If $(f_i - f_w)/(f_t - f_w)$ is smaller than the lower limit of condition (1), the lateral magnification of the second lens group becomes too large in a negative direction in the vicinity of the tele extremity, an increased number of lenses are necessary in the second lens group in order to compensate increased aberrations.

The zoom lens system 1000 further satisfies condition (2) below.

$$0.37 < d_i/f_w \tag{2}$$

where $f_w$ is the shortest focal length of the entire system, and $d_i$ is air gap, along the optical axis, between the first lens group and the aperture stop when the total length becomes shortest.

Condition (2) defines a distance from the first lens group 10 to the aperture stop S, and accordingly defines a space for the aperture stop. If $d_i/f_w$ is smaller than the lower limit, a distance between the first lens group and the aperture stop is too small to provide an aperture stop there.

It is preferable that the zoom lens system 1000 satisfies condition (3) below.

$$0.3 < f_w/f2 < 0.7 \tag{3}$$

where $f_2$ is focal length of the second lens group.

Condition (3) defines the power of the second lens group, and thus relates to a compactness and the optical performance of the lens system. If $f_w/f_2$ exceeds the upper limit of condition (3), coma and astigmatism of the second lens group cannot be compensated, and further, a predetermined back focus cannot be obtained. If $f_w/f_2$ is smaller than the lower limit of condition (3), the total length of the lens system is relatively long. Further, since the moving amount of the second lens group increases, the exit pupil distance at the tele extremity becomes too short to provide a telecentric system.

Further, the zoom lens system 1000 preferably satisfies condition (4) below.

$$0.7 < D_w/f_2 < 1.2 \tag{4}$$

where $D_w$ is distance between the aperture stop and a first principal point of the second lens group at a wide extremity.

Condition (4) defines a position of the aperture stop in relation with the second lens group, and thus defines a condition for obtaining appropriate exit pupil distance. When an image is formed on the CCD, in order to obtain the telecentric property, a certain exit pupil distance is required.

If $D_w/f_2$ is greater than the upper limit of condition (4), a distance between the aperture stop and the second lens group at the WIDE extremity, is too great, and thus the diameter of the second lens group increases. If $D_w/f_2$ is smaller than the lower limit of condition (4), a sufficient exit pupil distance cannot be obtained.

Furthermore, it is preferable that the zoom lens system 1000 satisfies condition (5) below.

$$1.65 < N_n \tag{5}$$

where $N_n$ is average refractive index of the negative lenses in the first lens group 10 at d-line.

Condition (5) defines the refractive index of at least two negative lenses, which are preferably to be included in the first lens group, to be satisfied. It is preferable that the average of the refractive index of the at-least-two negative lenses included in the first lens group satisfy condition (5). If index Nn is smaller than the lower limit of condition (5), it is difficult to compensate astigmatism.

[First Embodiment]

Figure 1:
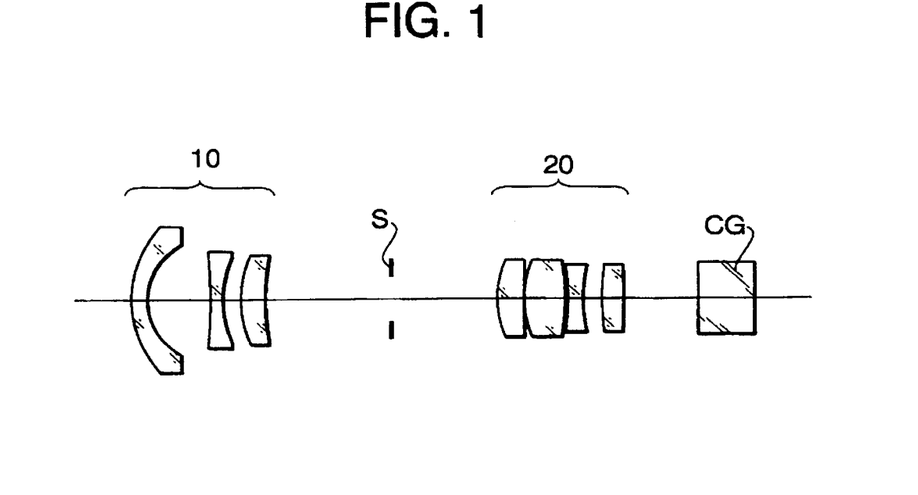
FIG. 1 shows a structure of a zoom lens system, at a wide extremity, according to a first embodiment.

FIG. 1 shows the construction of the zoom lens system according to a first embodiment at the wide extremity. The zoom lens system consists of a negative first lens group 10 that includes three lenses, a positive second lens group 20 that includes four lenses and an aperture stop S that is disposed between the first and second lens groups 10 and 20. The first and second lens groups are movable along an optical axis for zooming, while the aperture stop S is fixed to keep position thereof during zooming.

The numerical construction of the zoom lens system is described in TABLE 1. In the table, r (mm) denotes a radius of curvature of a surface (the values at the vertex for aspherical surfaces), d (mm) denotes a distance between the surfaces along the optical axis, N denotes a refractive index at a wavelength of 588 nm (d-line) and vd denotes an Abbe number.

The surfaces #1 through #6 indicate the first lens group 10, the surfaces #7 through #14 indicate the second lens group 20 and the surfaces #15 and #16 indicate a cover glass CG of a CCD. A light receiving surface of the CCD is set at the surface #16.

The surface #1 is an aspherical surface of which negative refractive power increases as the height from the optical axis increases. The surface #13 is also an aspherical surface.

An aspherical surface is expressed by the following equation (6):

$$X(h) = \frac{h^2 C}{1 + \sqrt{1 - (1 + K)h^2 C^2}} + A_4 h^4 + A_6 h^6 + A_8 h^8 + A_{10} h^{10} \quad (6)$$

X(h) is a SAG, that is, a distance of a curve from a tangential plane at a point on the surface where the height from the optical axis is h. C is a curvature (1/r) of the vertex of the surface, K is a conic constant, $A_4$, $A_6$, $A_8$ and $A_{10}$ are aspherical surface coefficients of fourth, sixth, eighth and tenth orders. The constant K and coefficients $A_4$, $A_6$, $A_8$ and $A_{10}$ are shown in TABLE 2.

The distance d6, the distance ds between the aperture stop S and the surface #7 and the distance #14 are variable for zooming. TABLE 3 shows these distances and focal length f (mm), F-number Fno., half view angle W (degree) and backfocus fB that is conversion distance in air between the surfaces #14 and #16. TABLE 3 shows values at the wide extremity ($f_w$) at the intermediate focal length $f_i$ and at the tele extremity ($f_t$)

TABLE 1

| Surface Number | r | d | n | | vd |
|---|---|---|---|---|---|
| #1 | 12.219 | 1.300 | 1.66910 | / | 55.4 |
| #2 | 6.435 | 5.677 | | | |
| #3 | −82.860 | 1.100 | 1.65844 | / | 50.9 |
| #4 | 11.476 | 1.674 | | | |
| #5 | 11.752 | 2.200 | 1.80518 | / | 25.4 |
| #6 | 24.428 | VARIABLE | | | |
| STOP | INFINITY | VARIABLE | | | |
| #7 | 10.168 | 2.341 | 1.60311 | / | 60.7 |
| #8 | 946.143 | 0.100 | | | |
| #9 | 9.939 | 3.594 | 1.51633 | / | 64.1 |
| #10 | −22.355 | 0.221 | | | |
| #11 | −19.962 | 1.200 | 1.80518 | / | 25.4 |
| #12 | 15.530 | 1.939 | | | |
| #13 | 32.960 | 1.808 | 1.66910 | / | 55.4 |
| #14 | −55.884 | VARIABLE | | | |
| #15 | INFINITY | 5.000 | 1.51633 | / | 64.1 |
| #16 | INFINITY | — | | | |

TABLE 2

| Surface #1 | Surface #13 |
|---|---|
| K = 0.0000 | K = 0.0000 |
| $A_4$ = 0.6837 × $10^{-4}$ | $A_4$ = −0.5795 × $10^{-3}$ |
| $A_6$ = 0.1189 × $10^{-6}$ | $A_6$ = −0.9713 × $10^{-5}$ |
| $A_8$ = 0.1451 × $10^{-7}$ | $A_8$ = 0.0000 |
| $A_{10}$ = 0.0000 | $A_{10}$ = 0.0000 |

TABLE 3

| | WIDE ($f_w$) | $f_i$ | TELE ($f_t$) |
|---|---|---|---|
| d6 | 11.547 | 2.764 | 2.900 |
| ds | 9.477 | 2.473 | 1.100 |
| d14 | 6.773 | 13.777 | 15.151 |

TABLE 3-continued

| | WIDE ($f_w$) | $f_i$ | TELE ($f_t$) |
|---|---|---|---|
| f | 5.900 | 13.30 | 14.75 |
| Fno. | 1:2.8 | 1:4.6 | 1:5.2 |
| W | 32.5° | 15.2° | 13.7° |
| fB | 10.07 | 17.07 | 18.45 |

FIGS. 2A through 2D show third order aberrations of the zoom lens system according to the first embodiment at the wide extremity (in the shortest focal length).

Figures 2A, 2B:
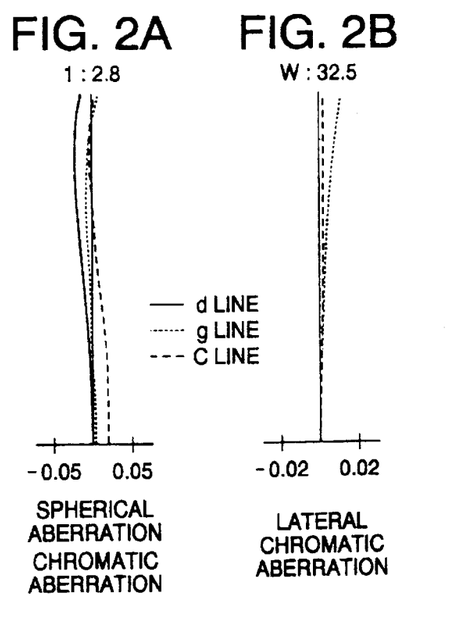
FIGS. 2A, 2B, 2C and 2D are graphs showing spherical aberration, lateral chromatic aberration, astigmatism and distortion, respectively, when the zoom lens system shown in FIG. 1 is located at the wide extremity.
Figure 2C:
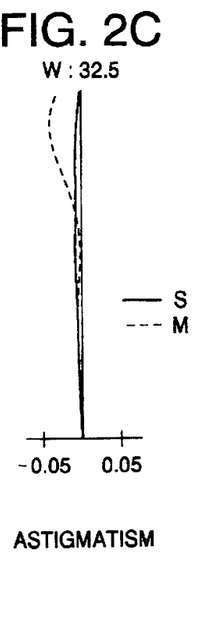

Specifically, FIG. 2A shows spherical aberrations at d-line (588 nm), g-line (436 nm) and c-line (656 nm);

FIG. 2B shows a lateral chromatic aberration at the same wavelengths as in FIG. 2A;

FIG. 2C shows an astigmatism (S: Sagittal, M: Meridional); and

Figure 2D:
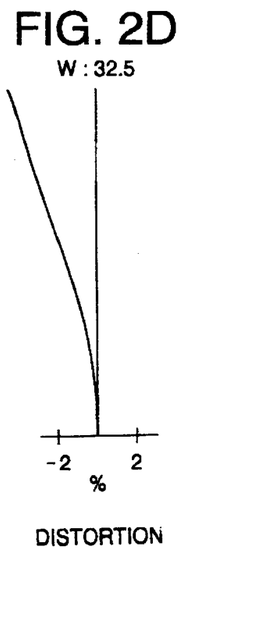
Figures 3A, 3B:
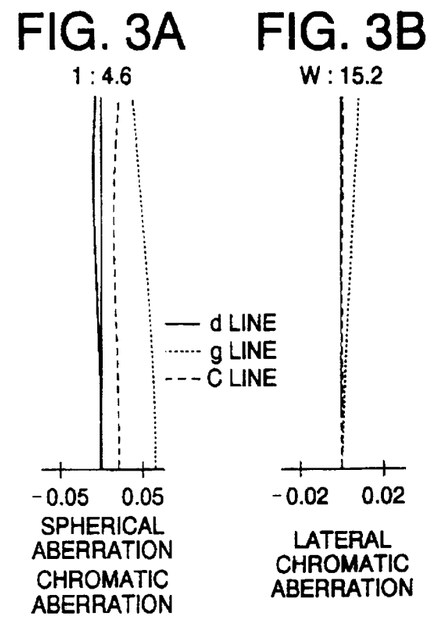
FIGS. 3A, 3B, 3C and 3D are graphs showing spherical aberration, lateral chromatic aberration, astigmatism and distortion, respectively, when the zoom lens system shown in FIG. 1 is located at an intermediate position within a zooming range.
Figure 3C:
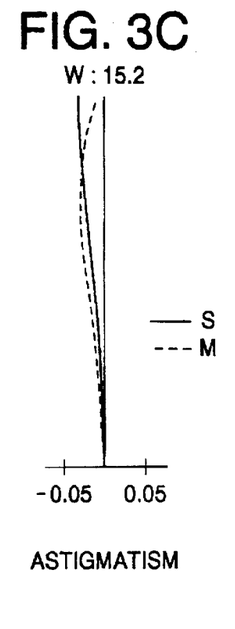
Figure 3D:
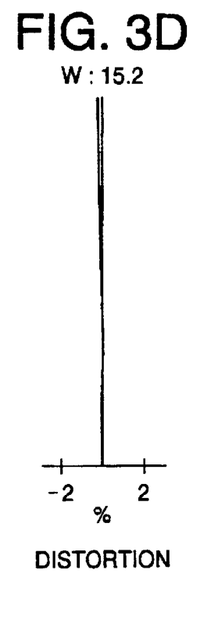
Figures 4A, 4B:
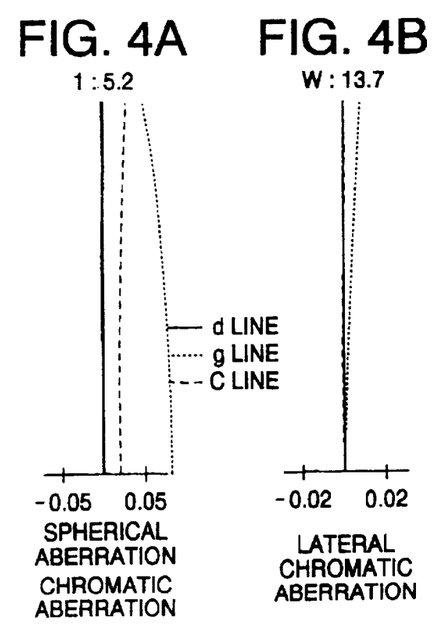
FIGS. 4A, 4B, 4C and 4D are graphs showing spherical aberration, lateral chromatic aberration, astigmatism and distortion, respectively, when the zoom lens system shown in FIG. 1 is located at the tele extremity.
Figure 4C:
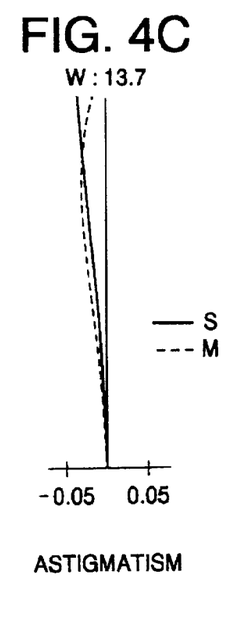
Figure 4D:
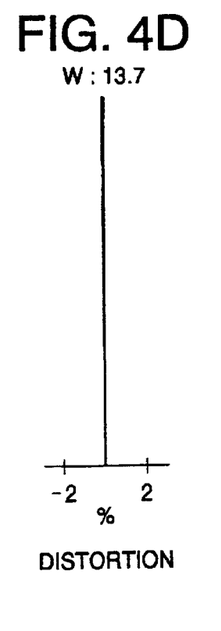

FIG. 2D shows distortion.

The vertical axis in FIG. 2A represents F-number, and the vertical axes in FIGS. 2B through 2D respectively represent a half view angle w (degrees). Unit of the horizontal axis is "mm" in each of FIGS. 2A through 2C, and is "percent" in FIG. 2D.

FIGS. 3A through 3D show various aberrations of the zoom lens system according to the first embodiment in the intermediate focal length. Further, FIGS. 4A through 4D show various aberrations of the zoom lens system according to the first embodiment at the tele extremity (in the longest focal length).

[Second Embodiment]

Figure 5:
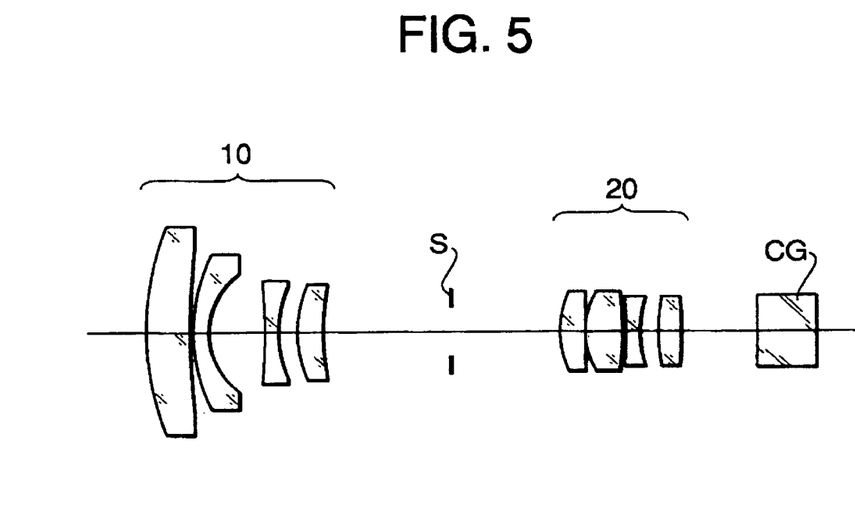
FIG. 5 shows a structure of a zoom lens system, at a wide extremity, according to a second embodiment.
Figures 6A, 6B:
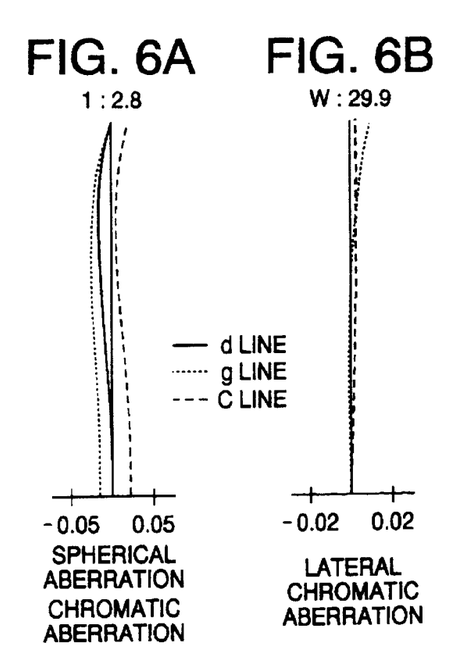
FIGS. 6A, 6B, 6C and 6D are graphs showing spherical aberration, lateral chromatic aberration, astigmatism and distortion, respectively, when the zoom lens system shown in FIG. 5 is located at the wide extremity.
Figure 6C:
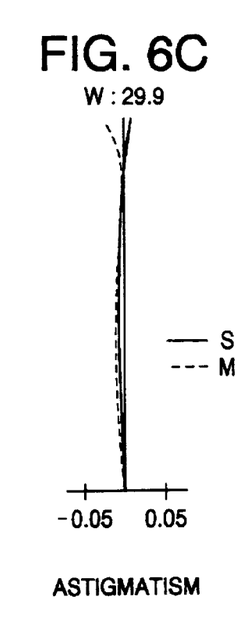
Figure 6D:
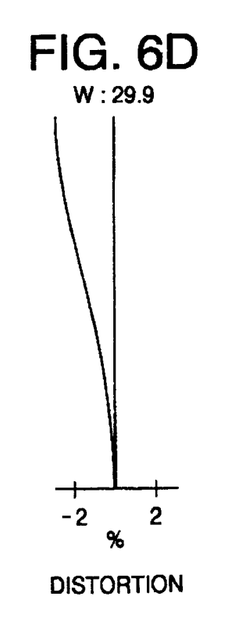
Figures 7A, 7B:
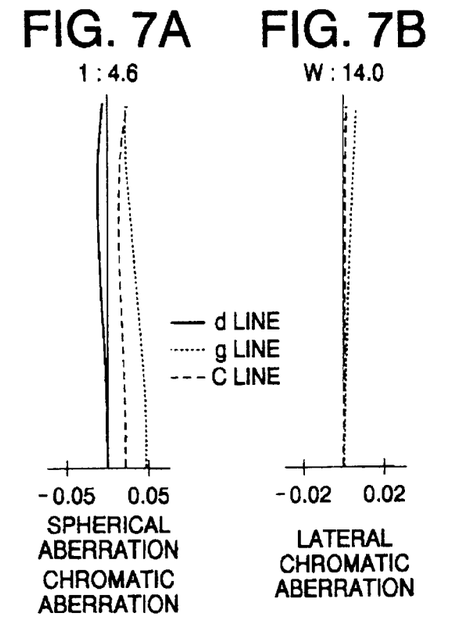
FIGS. 7A, 7B, 7C and 7D are graphs showing spherical aberration, lateral chromatic aberration, astigmatism and distortion, respectively, when the zoom lens system shown in FIG. 5 is located at an intermediate position within a zooming range.
Figure 7C:
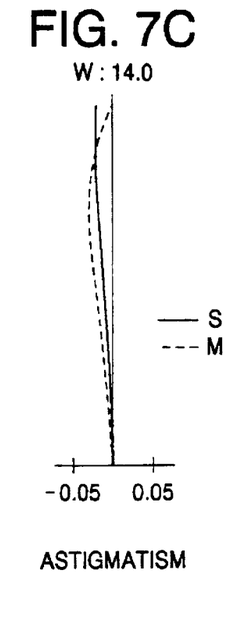
Figure 7D:
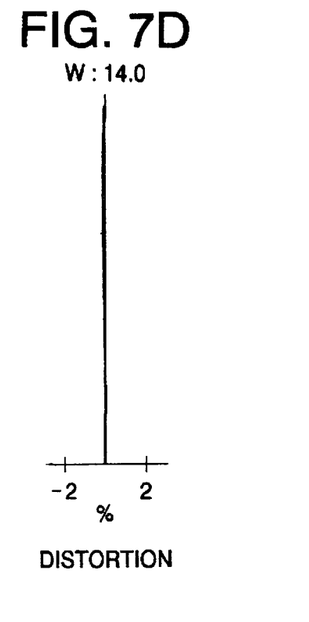
Figures 8A, 8B:
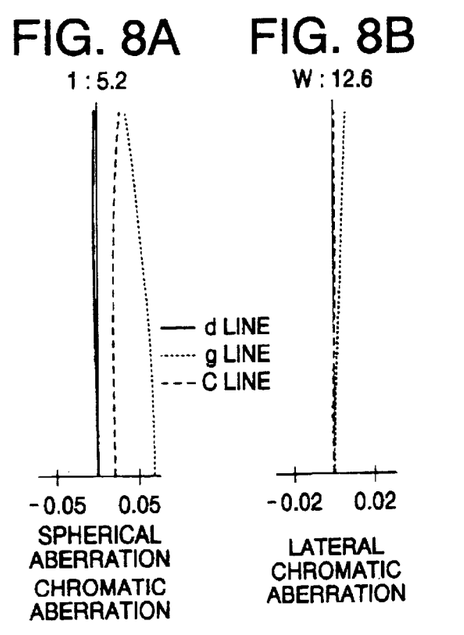
FIGS. 8A, 8B, 8C and 8D are graphs showing spherical aberration, lateral chromatic aberration, astigmatism and distortion, respectively, when the zoom lens system shown in FIG. 5 is located at the tele extremity.
Figure 8C:
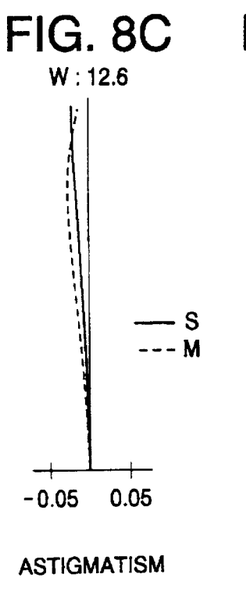
Figure 8D:
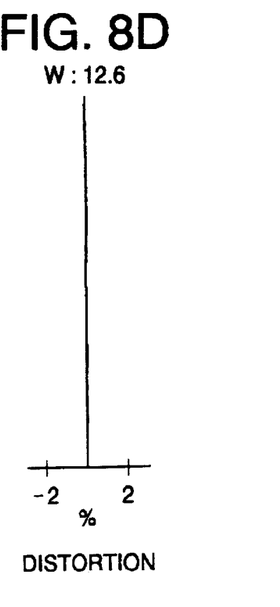

FIG. 5 shows the construction of the zoom lens system according to a second embodiment at the wide extremity. The zoom lens system consists of a negative first lens group 10 that includes four lenses, a positive second lens group 20 that includes four lenses and an aperture stop S that is stationarily disposed between the first and second lens groups 10 and 20.

The numerical construction of the zoom lens system is described in TABLE 4. The surfaces #1 through #8 indicate the first lens group 10, the surfaces #9 through #16 indicate the second lens group 20 and the surfaces #17 and #18 indicate a cover glass CG of a CCD. A light receiving surface of the CCD is set at the surface #18.

The surface #15 is an aspherical surface. The constant and coefficients are shown in TABLE 5.

The distance d8, the distance ds between the aperture stop S and the surface #9 and the distance d16 are variable for zooming. TABLE 6 shows these distances and focal length f (mm), F-number Fno., half view angle W (degree) and backfocus fB.

TABLE 4

| Surface Number | r | d | n | | vd |
|---|---|---|---|---|---|
| #1 | 28.889 | 3.684 | 1.68600 | / | 49.1 |
| #2 | 118.551 | 0.200 | | | |
| #3 | 17.305 | 1.200 | 1.66672 | / | 48.3 |
| #4 | 6.642 | 4.726 | | | |
| #5 | −99.136 | 1.100 | 1.77250 | / | 49.6 |
| #6 | 10.732 | 1.630 | | | |
| #7 | 10.837 | 2.200 | 1.80518 | / | 25.4 |

TABLE 4-continued

| Surface Number | r | d | n | | vd |
|---|---|---|---|---|---|
| #8 | 22.236 | VARIABLE | | | |
| STOP | INFINITY | VARIABLE | | | |
| #9 | 10.215 | 2.213 | 1.65160 | / | 58.5 |
| #10 | 71.265 | 0.100 | | | |
| #11 | 8.994 | 3.046 | 1.60311 | / | 60.7 |
| #12 | −77.082 | 0.249 | | | |
| #13 | −46.873 | 1.200 | 1.80518 | / | 25.4 |
| #14 | 9.974 | 1.591 | | | |
| #15 | 18.565 | 1.982 | 1.66910 | / | 55.4 |
| #16 | −63.817 | VARIABLE | | | |
| #17 | INFINITY | 5.000 | 1.51633 | / | 64.1 |
| #18 | INFINITY | — | | | |

TABLE 5

Surface #15

$K = 0.0000$
$A_4 = -0.6138 \times 10^{-3}$    $A_8 = 0.0000$
$A_6 = -0.1290 \times 10^{-4}$    $A_{10} = 0.0000$

TABLE 6

| | WIDE ($f_w$) | $f_i$ | TELE ($f_t$) |
|---|---|---|---|
| d8 | 10.926 | 2.785 | 2.921 |
| ds | 9.364 | 2.825 | 1.484 |
| d16 | 6.526 | 13.066 | 14.406 |
| f | 5.900 | 13.25 | 14.75 |
| Fno. | 1:2.8 | 1:4.6 | 1:5.2 |
| W | 29.9° | 14.0° | 12.6° |
| fB | 9.82 | 16.36 | 17.70 |

FIGS. 6A through 6D show various aberrations of the zoom lens system according to the second embodiment at the wide extremity. FIGS. 7A through 7D and FIGS. 8A through 8D show various aberrations of the zoom lens system according to the second embodiment in the intermediate focal length and at the tele extremity, respectively.

[Third Embodiment]

Figure 9:
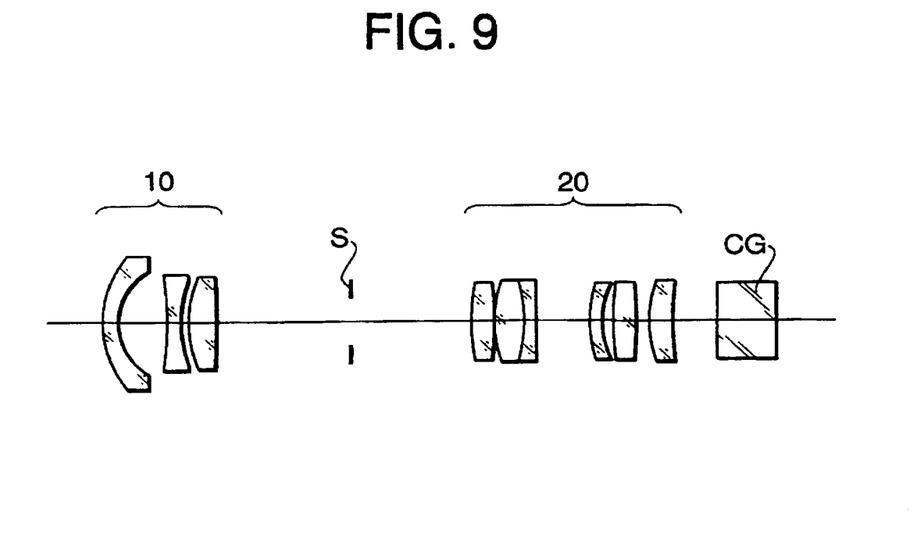
FIG. 9 shows a structure of a zoom lens system, at a wide extremity, according to a third embodiment.
Figures 10A, 10B:
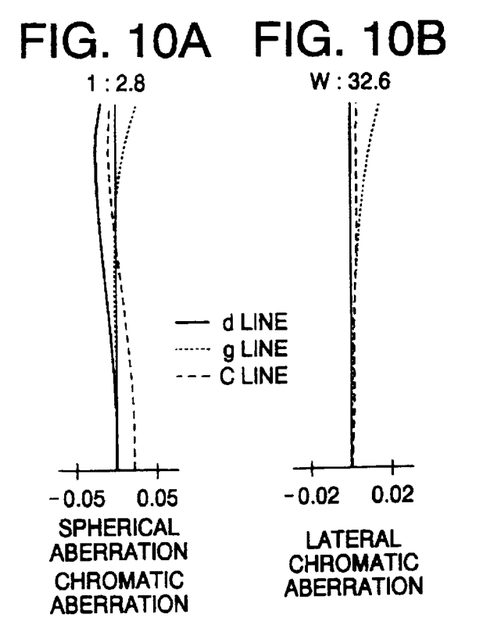
FIGS. 10A, 10B, 10C and 10D are graphs showing spherical aberration, lateral chromatic aberration, astigmatism and distortion, respectively, when the zoom lens system shown in FIG. 9 is located at the wide extremity.
Figure 10C:
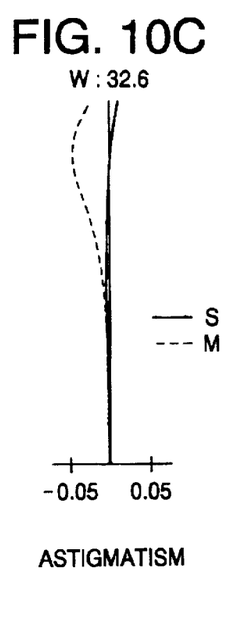
Figure 10D:
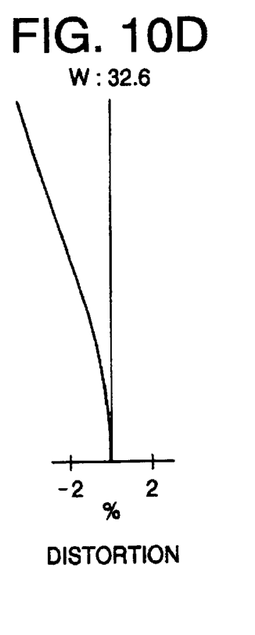
Figures 11A, 11B:
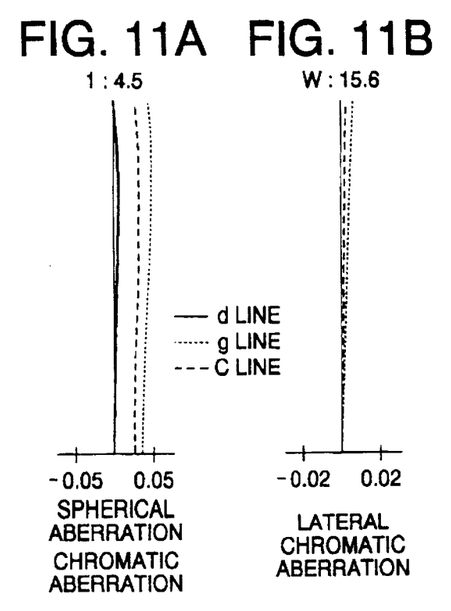
FIGS. 11A, 11B, 11C and 11D are graphs showing spherical aberration, lateral chromatic aberration, astigmatism and distortion, respectively, when the zoom lens system shown in FIG. 9 is located at an intermediate position within a zooming range.
Figure 11C:
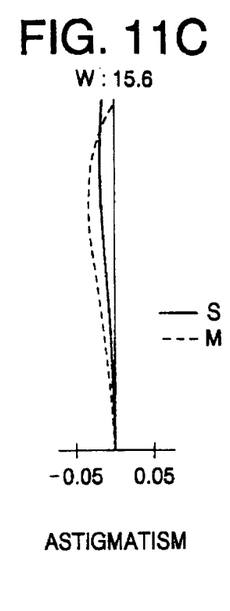
Figure 11D:
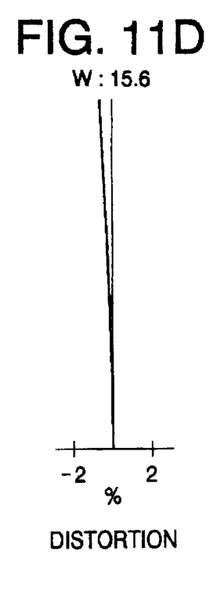
Figures 12A, 12B:
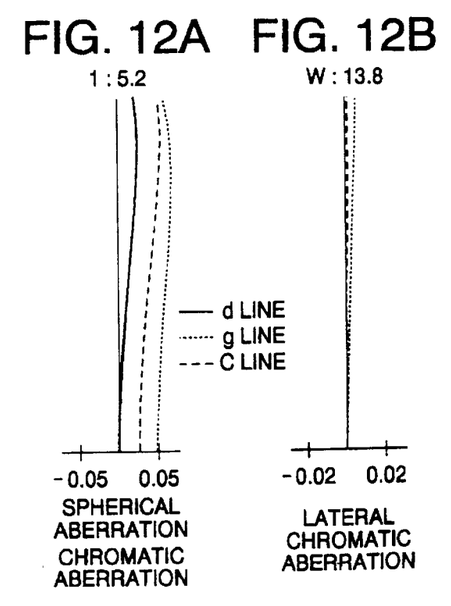
FIGS. 12A, 12B, 12C and 12D are graphs showing spherical aberration, lateral chromatic aberration, astigmatism and distortion, respectively, when the zoom lens system shown in FIG. 9 is located at the tele extremity.
Figure 12C:
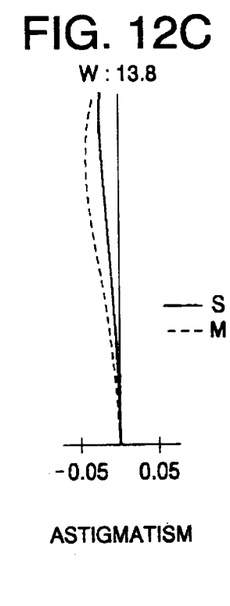
Figure 12D:
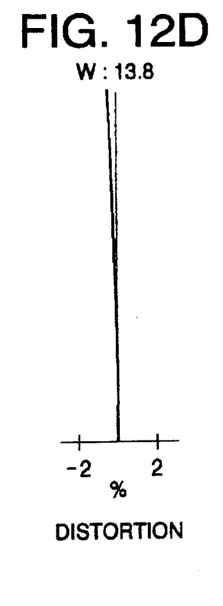

FIG. 9 shows the construction of the zoom lens system according to a third embodiment at the wide extremity. The zoom lens system consists of a negative first lens group 10 that includes three lenses, a positive second lens group 20 that includes six lenses and an aperture stop S that is stationarily disposed between the first and second lens groups 10 and 20.

The numerical construction of the zoom lens system is described in TABLE 7. The surfaces #1 through #6 indicate the first lens group 10, the surfaces #7 through #17 indicate the second lens group 20 and the surfaces #18 and #19 indicate a cover glass CG of a CCD. A light receiving surface of the CCD is set at the surface #19.

The surface #1 is an aspherical surface of which negative refractive power increases as the height from the optical axis increases. The constant and coefficients are shown in TABLE 8.

The distance d6, the distance ds between the aperture stop S and the surface #7 and the distance d17 are variable for zooming. TABLE 9 shows these distances and focal length f (mm), F-number Fno., half view angle W (degree) and backfocus fB.

TABLE 7

| Surface Number | r | d | n | | vd |
|---|---|---|---|---|---|
| #1 | 12.093 | 1.200 | 1.66910 | / | 55.4 |
| #2 | 5.738 | 4.381 | | | |
| #3 | −27.439 | 1.100 | 1.83400 | / | 37.2 |
| #4 | 13.687 | 0.748 | | | |
| #5 | 13.013 | 2.305 | 1.80518 | / | 25.4 |
| #6 | −162.028 | VARIABLE | | | |
| STOP | INFINITY | VARIABLE | | | |
| #7 | 23.881 | 2.004 | 1.81600 | / | 46.6 |
| #8 | −55.291 | 0.100 | | | |
| #9 | 13.847 | 2.600 | 1.48749 | / | 70.2 |
| #10 | −13.847 | 1.000 | 1.80518 | / | 25.4 |
| #11 | −53.397 | 4.678 | | | |
| #12 | 13.711 | 1.000 | 1.84666 | / | 23.8 |
| #13 | 7.373 | 0.991 | | | |
| #14 | 30.093 | 2.000 | 1.61772 | / | 49.8 |
| #15 | −78.471 | 1.182 | | | |
| #16 | 13.391 | 2.000 | 1.83481 | / | 42.7 |
| #17 | 21.092 | VARIABLE | | | |
| #18 | INFINITY | 5.000 | 1.51633 | / | 64.1 |
| #19 | INFINITY | — | | | |

TABLE 8

Surface #1

$K = 0.0000$
$A_4 = 0.9806 \times 10^{-4}$    $A_8 = 0.1711 \times 10^{-7}$
$A_6 = 0.6760 \times 10^{-6}$    $A_{10} = 0.0000$

TABLE 9

| | WIDE ($f_w$) | $f_i$ | TELE ($f_t$) |
|---|---|---|---|
| d6 | 11.611 | 2.688 | 2.901 |
| ds | 10.305 | 2.906 | 1.100 |
| d17 | 3.794 | 11.193 | 12.999 |
| f | 5.900 | 13.01 | 14.75 |
| Fno. | 1:2.8 | 1:4.5 | 1:5.2 |
| W | 32.6° | 15.6° | 13.8° |
| fB | 7.09 | 14.49 | 16.30 |

FIGS. 10A through 10D show various aberrations of the zoom lens system according to the third embodiment at the wide extremity. FIGS. 11A through 11D and FIGS. 12A through 12D show various aberrations of the zoom lens system according to the third embodiment in the intermediate focal length and at the tele extremity, respectively.

[Fourth Embodiment]

Figure 13:
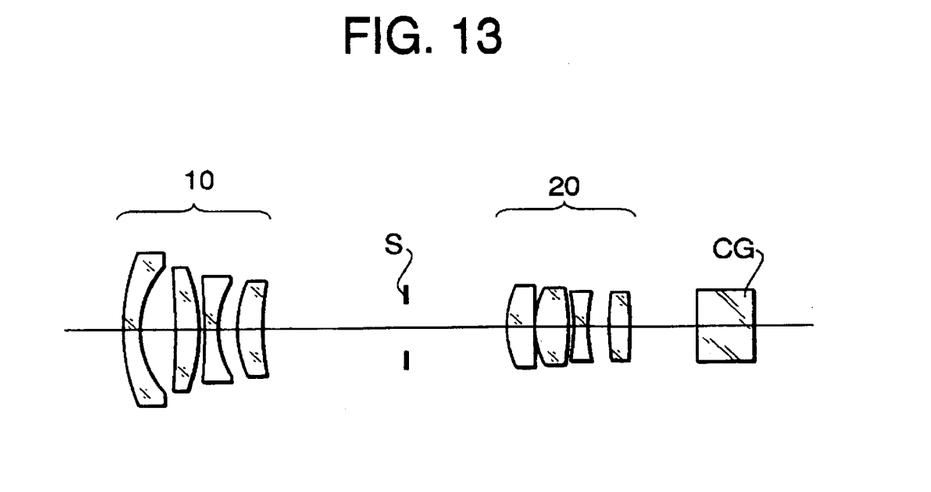
FIG. 13 shows a structure of a zoom lens system, at a wide extremity, according to a fourth embodiment.
Figures 14A, 14B:
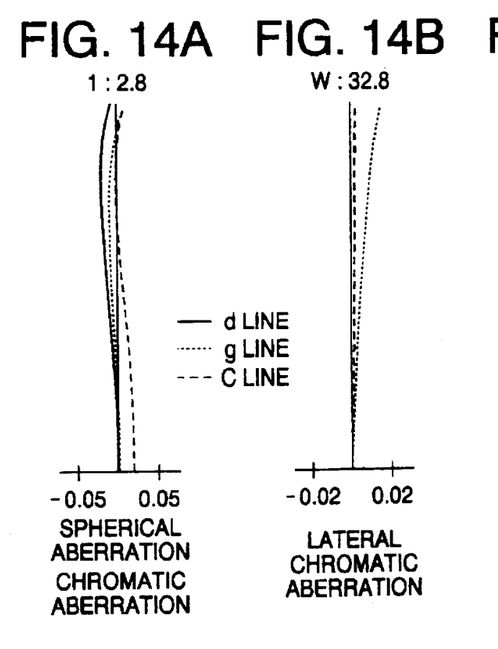
FIGS. 14A, 14B, 14C and 14D are graphs showing spherical aberration, lateral chromatic aberration, astigmatism and distortion, respectively, when the zoom lens system shown in FIG. 13 is located at the wide extremity.
Figure 14C:
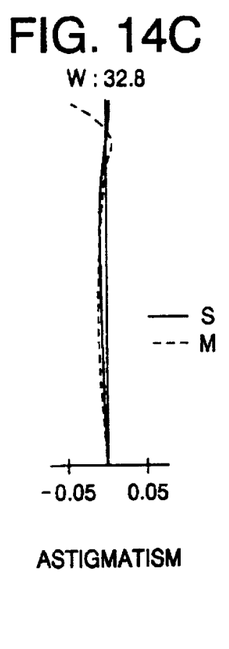
Figure 14D:
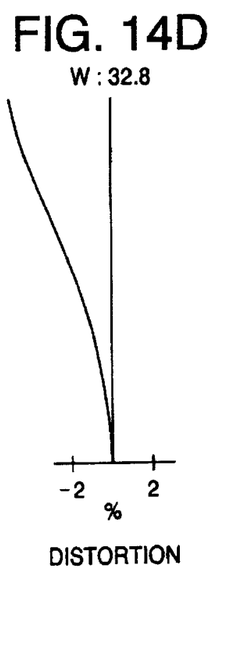
Figures 15A, 15B:
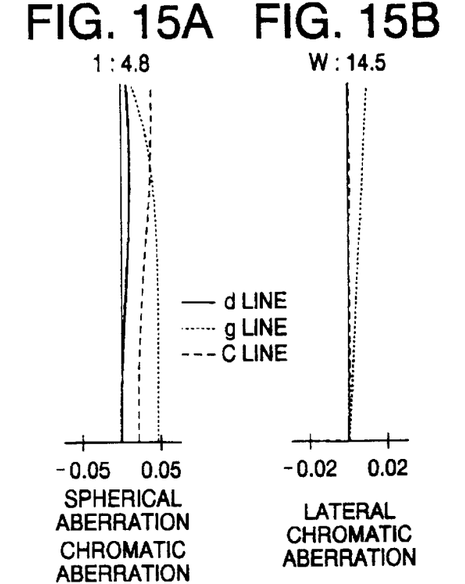
FIGS. 15A, 15B, 15C and 15D are graphs showing spherical aberration, lateral chromatic aberration, astigmatism and distortion, respectively, when the zoom lens system shown in FIG. 13 is located at an intermediate position within a zooming range.
Figure 15C:
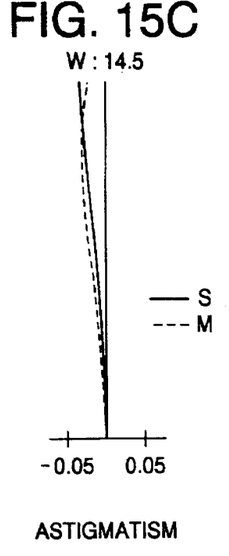
Figure 15D:
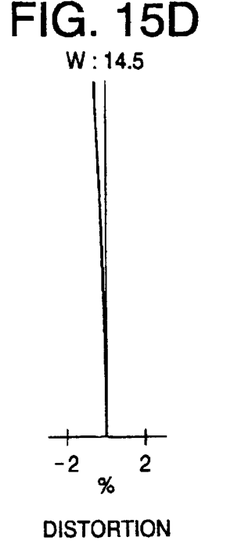
Figures 16A, 16B:
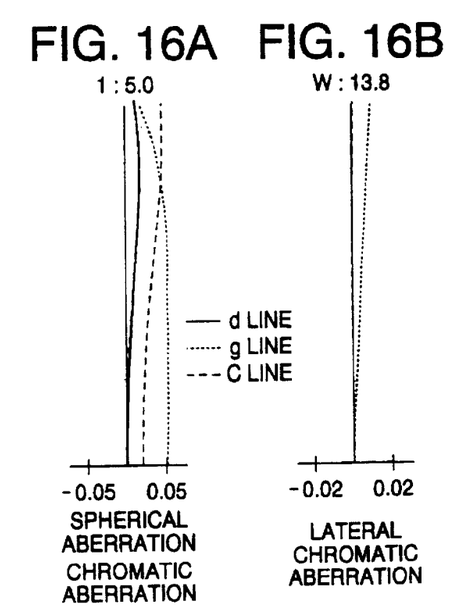
FIGS. 16A, 16B, 16C and 16D are graphs showing spherical aberration, lateral chromatic aberration, astigma-tism and distortion, respectively, when the zoom lens system shown in FIG. 13 is located at the tele extremity.
Figure 16C:
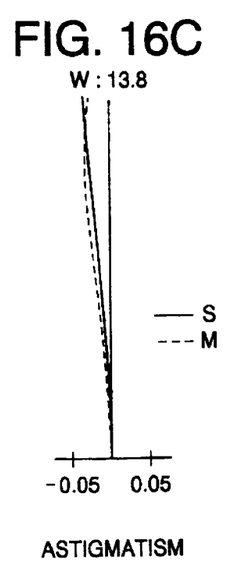
Figure 16D:
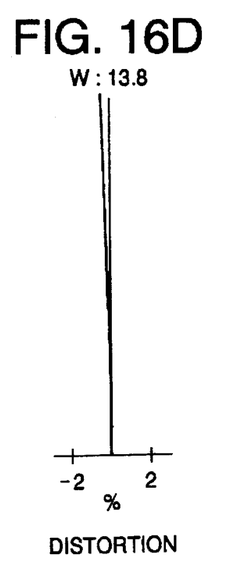

FIG. 13 shows the construction of the zoom lens system according to a fourth embodiment at the wide extremity. The zoom lens system consists of a negative first lens group 10 that includes four lenses, a positive second lens group 20 that includes four lenses and an aperture stop S that is stationarily disposed between the first and second lens groups 10 and 20.

The numerical construction of the zoom lens system is described in TABLE 10. The surfaces #1 through #8 indicate the first lens group 10, the surfaces #9 through #16 indicate the second lens group 20 and the surfaces #17 and #18 indicate a cover glass CG of a CCD. A light receiving surface of the CCD is set at the surface #18.

The surface #15 is an aspherical surface. The constant and coefficients are shown in TABLE 11.

The distance d8, the distance ds between the aperture stop S and the surface #9 and the distance d16 are variable for zooming. TABLE 12 shows these distances and focal length f (mm), F-number Fno., half view angle W (degree) and backfocus fB.

TABLE 10

| Surface Number | r | d | n | / | vd |
|---|---|---|---|---|---|
| #1 | 23.001 | 1.300 | 1.83481 | / | 42.7 |
| #2 | 9.519 | 3.064 | | | |
| #3 | −78.783 | 2.111 | 1.80518 | / | 25.4 |
| #4 | −18.069 | 0.500 | | | |
| #5 | −50.606 | 1.100 | 1.83400 | / | 37.2 |
| #6 | 8.208 | 1.724 | | | |
| #7 | 10.277 | 2.200 | 1.80518 | / | 25.4 |
| #8 | 28.368 | VARIABLE | | | |
| STOP | INFINITY | VARIABLE | | | |
| #9 | 8.837 | 2.391 | 1.65160 | / | 58.5 |
| #10 | 66.089 | 0.123 | | | |
| #11 | 10.132 | 2.892 | 1.58913 | / | 61.2 |
| #12 | −26.075 | 0.438 | | | |
| #13 | −16.474 | 1.200 | 1.80518 | / | 25.4 |
| #14 | 12.656 | 1.875 | | | |
| #15 | 23.608 | 1.827 | 1.66910 | / | 55.4 |
| #16 | −53.449 | VARIABLE | | | |
| #17 | INFINITY | 5.000 | 1.51633 | / | 64.1 |
| #18 | INFINITY | — | | | |

TABLE 11

Surface #15

$K = 0.0000$
$A_4 = -0.7345 \times 10^{-3}$       $A_8 = -0.2706 \times 10^{-6}$
$A_6 = -0.1270 \times 10^{-4}$       $A_{10} = 0.0000$

TABLE 12

| | WIDE ($f_w$) | $f_i$ | TELE ($f_t$) |
|---|---|---|---|
| d8 | 12.479 | 2.924 | 2.959 |
| ds | 8.877 | 1.901 | 1.237 |
| d16 | 5.865 | 12.841 | 13.504 |
| f | 5.40 | 12.80 | 13.50 |
| Fno. | 1:2.8 | 1:4.8 | 1:5.0 |
| W | 32.8° | 14.5° | 13.82° |
| fB | 9.16 | 16.14 | 16.80 |

FIGS. 14A through 14D show various aberrations of the zoom lens system according to the fourth embodiment at the wide extremity. FIGS. 15A through 15D and FIGS. 16A through 16D show various aberrations of the zoom lens system according to the fourth embodiment in the intermediate focal length and at the tele extremity, respectively.

[Fifth Embodiment]

Figure 17:
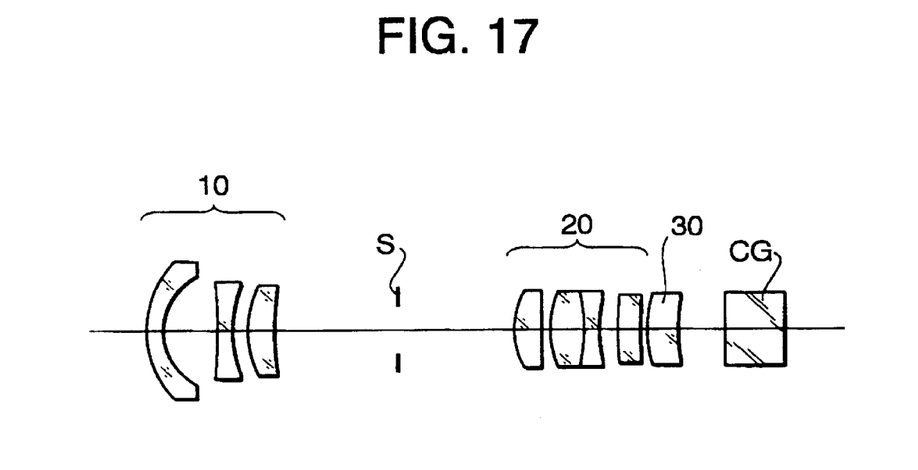
FIG. 17 shows a structure of a zoom lens system, at a wide extremity, according to a fifth embodiment.
Figure 18A:
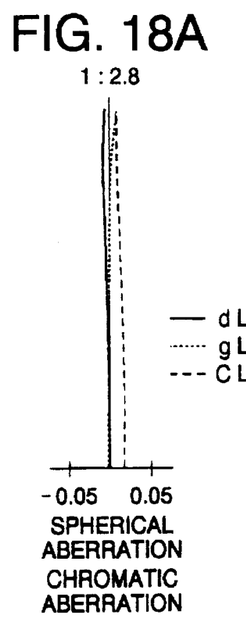
FIGS. 18A, 18B, 18C and 18D are graphs showing spherical aberration, lateral chromatic aberration, astigmatism and distortion, respectively, when the zoom lens system shown in FIG. 17 is located at the wide extremity.
Figure 18B:
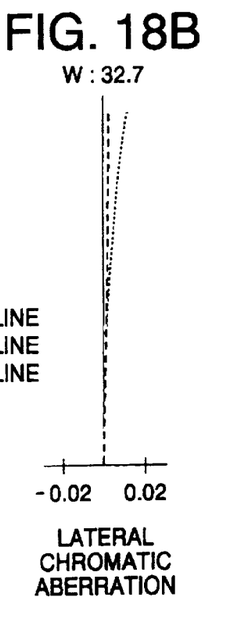
Figure 18C:
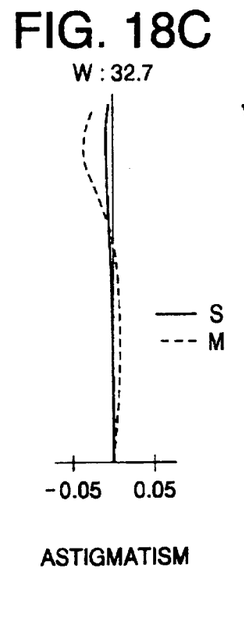
Figure 18D:
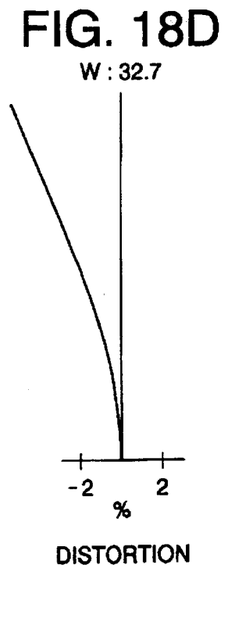
Figures 19A, 19B:
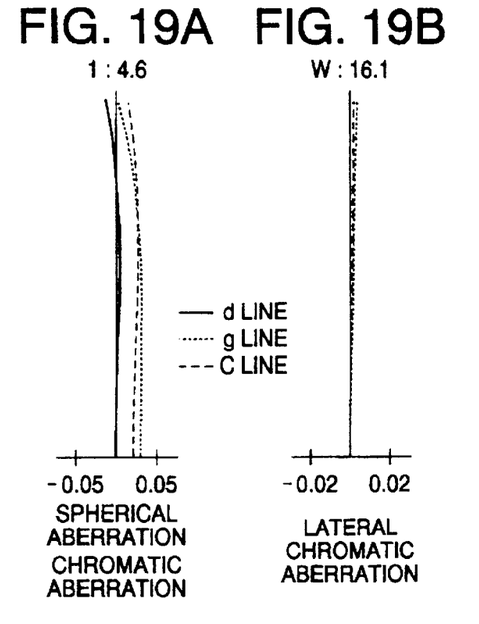
FIGS. 19A, 19B, 19C and 19D are graphs showing spherical aberration, lateral chromatic aberration, astigmatism and distortion, respectively, when the zoom lens system shown in FIG. 17 is located at an intermediate position within a zooming range.
Figure 19C:
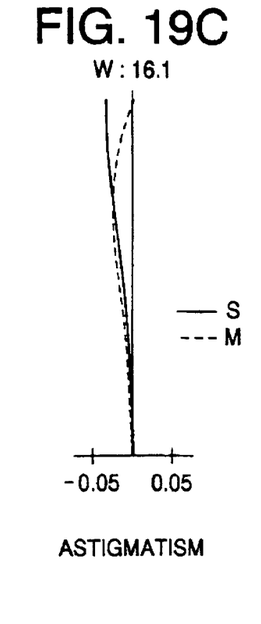
Figure 19D:
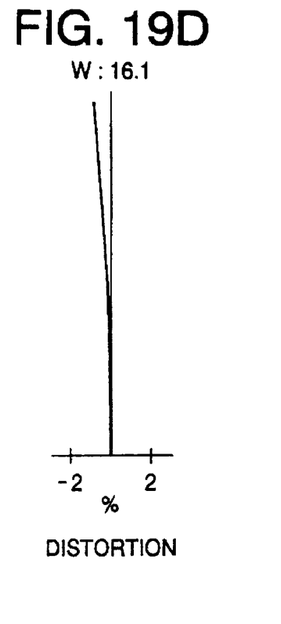
Figures 20A, 20B:
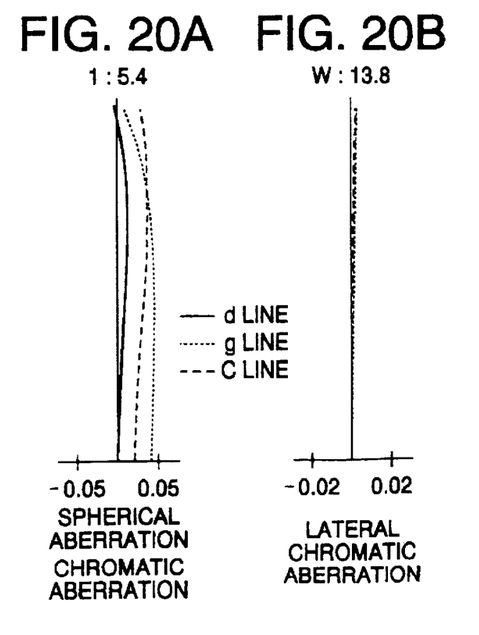
FIGS. 20A, 20B, 20C and 20D are graphs showing spherical aberration, lateral chromatic aberration, astigmatism and distortion, respectively, when the zoom lens system shown in FIG. 17 is located at the tele extremity.
Figure 20C:
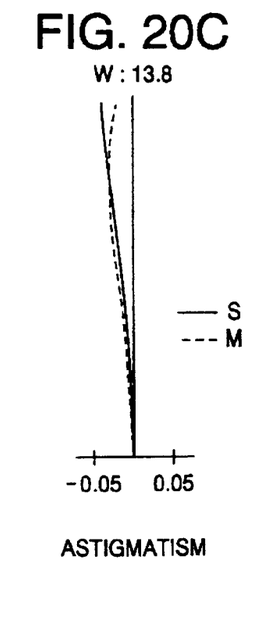
Figure 20D:
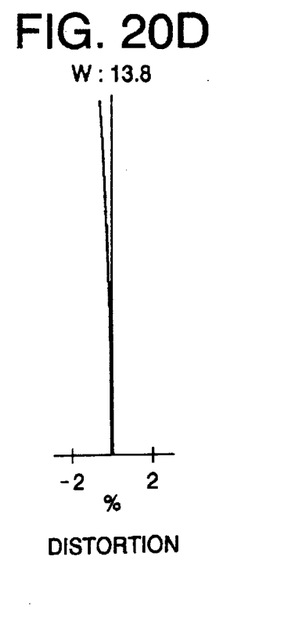

FIG. 17 shows the construction of the zoom lens system according to a fifth embodiment at the wide extremity. The zoom lens system consists of a movable first lens group 10, a movable second lens group 20, a stationary third lens group 30 and an aperture stop S that is stationarily disposed between the first and second lens groups 10 and 20. The first lens group 10 consists of three lenses and has negative power. The second lens group 20 consists of four lenses and has positive power. The third lens group 30 consists of a positive single lens.

The numerical construction of the zoom lens system is described in TABLE 13. The surfaces #1 through #6 indicate the first lens group 10, the surfaces #7 through #13 indicate the second lens group 20, the surfaces #14 and #15 indicate the third lens group 30 and the surfaces #16 and #17 indicate a cover glass CG of a CCD. A light receiving surface of the CCD is set at the surface #17.

The surface #1 is an aspherical surface of which negative refractive power increases as the distance from the optical axis increases. The surface #12 is also an aspherical surface. The constant and coefficients of the aspherical surfaces are shown in TABLE 14.

The distance d6, the distance ds between the aperture stop S and the surface #7 and the distance d13 are variable for zooming. TABLE 15 shows these distances and focal length f (mm), F-number Fno., half view angle W (degree) and backfocus fB.

TABLE 13

| Surface Number | r | d | n | / | vd |
|---|---|---|---|---|---|
| #1 | 12.356 | 1.300 | 1.66910 | / | 55.4 |
| #2 | 6.250 | 4.622 | | | |
| #3 | −70.102 | 1.100 | 1.72000 | / | 50.2 |
| #4 | 12.351 | 1.328 | | | |
| #5 | 11.946 | 2.200 | 1.80518 | / | 25.4 |
| #6 | 34.386 | VARIABLE | | | |
| STOP | INFINITY | VARIABLE | | | |
| #7 | 8.937 | 2.341 | 1.58913 | / | 61.2 |
| #8 | 109.840 | 0.582 | | | |
| #9 | 9.247 | 3.000 | 1.48749 | / | 70.2 |
| #10 | −26.849 | 1.200 | 1.80518 | / | 25.4 |
| #11 | 14.316 | 1.635 | | | |
| #12 | 19.132 | 2.000 | 1.66910 | / | 55.4 |
| #13 | 62.488 | VARIABLE | | | |
| #14 | 15.870 | 2.500 | 1.74077 | / | 27.8 |
| #15 | 16.617 | 4.001 | | | |
| #16 | INFINITY | 5.000 | 1.51633 | / | 64.1 |
| #17 | INFINITY | — | | | |

TABLE 14

| Surface #1 | Surface #12 |
|---|---|
| $K = 0.0000$ | $K = 0.0000$ |
| $A_4 = 0.6085 \times 10^{-4}$ | $A_4 = -0.7024 \times 10^{-3}$ |
| $A_6 = 0.4954 \times 10^{-6}$ | $A_6 = -0.8844 \times 10^{-5}$ |
| $A_8 = 0.9721 \times 10^{-8}$ | $A_8 = -0.3487 \times 10^{-6}$ |
| $A_{10} = 0.0000$ | $A_{10} = 0.0000$ |

TABLE 15

| | WIDE ($f_w$) | $f_i$ | TELE ($f_t$) |
|---|---|---|---|
| d6 | 10.247 | 2.660 | 2.991 |
| ds | 9.946 | 3.219 | 0.998 |
| d13 | 0.500 | 7.226 | 9.448 |
| f | 5.900 | 12.55 | 14.75 |
| Fno. | 1:2.8 | 1:4.6 | 1:5.4 |
| W | 32.7° | 16.1° | 13.8° |
| fB | 7.30 | 7.30 | 7.30 |

FIGS. 18A through 18D show various aberrations of the zoom lens system according to the fifth embodiment at the wide extremity. FIGS. 19A through 19D and FIGS. 20A through 20D show various aberrations of the zoom lens system according to the fifth embodiment in the intermediate focal length and at the tele extremity, respectively.

The following TABLE 16 shows the values of the first to fifth embodiments for conditions (1) to (5).

TABLE 16

| Conditions | Embodiments | | | | |
|---|---|---|---|---|---|
| | 1 | 2 | 3 | 4 | 5 |
| (1) $(f_i - f_w)/(f_t - f_w)$ | 0.836 | 0.830 | 0.804 | 0.913 | 0.752 |
| (2) $d_i/f_w$ | 0.468 | 0.472 | 0.456 | 0.541 | 0.451 |
| (3) $f_w/f2$ | 0.469 | 0.500 | 0.436 | 0.447 | 0.465 |
| (4) $D_w/f_2$ | 0.762 | 0.814 | 0.906 | 0.726 | 0.730 |
| (5) $N_n$ | 1.664 | 1.720 | 1.752 | 1.834 | 1.695 |

Each of the embodiments satisfies conditions (1) through (5), and is suitable to the zoom lens system for a mega-pixel high-resolution CCD camera.

The present disclosure relates to the subject matter contained in Japanese Patent Application NO. HEI 10-24788, filed on Feb. 5, 1998, which is expressly incorporated herein by reference in its entirety.

What is claimed is:

1. A zoom lens system, comprising:

a negative first lens group that is movable along an optical axis for zooming, said negative first lens group being a closest lens group to an object, of any lens group of said zoom lens system;

a positive second lens group that is movable along said optical axis for zooming, said positive second lens group being positioned at an image side of said first negative lens group; and an aperture stop that is an only element positioned between said first and second lens groups, said aperture stop being fixedly positioned during zooming, wherein the zoom lens system satisfies following relationships:

$$0.7 < (f_t - f_w)/(f_t - f_w) < 1.0$$

$$0.37 < d_i/f_w$$

$$0.3 < f/f2 < 0.7$$

where $f_1$ is a focal length of the entire zoom lens system when the total length of the entire zoom lens system becomes shortest, $f_w$ is the shortest focal length of the entire zoom lens system, $f_t$ is the longest focal length of the entire zoom lens system, $d_i$ is an air gap along the optical axis between the first lens group and the aperture stop when the total length becomes shortest, and $f_2$ is focal length of the second lens group.

2. The zoom lens according to claim 1, the zoom lens system further satisfying the following relationship:

$$0.7 < D_w/f_2 < 1.2$$

where $D_w$ is a distance between the aperture stop and a first principal point of the second lens group at a wide extremity.

3. The zoom lens system according to claim 1, wherein said first lens group is moved such that distance between said first lens group and said aperture stop becomes the smallest at an intermediate position between the wide extremity and the tele extremity, and wherein said second lens group moves such that the distance between said second lens group and said aperture stop decreases gradually as the entire focal length increases.

4. The zoom lens according to claim 1, wherein said first lens group includes at least two negative lenses and the following relationship is satisfied:

$$1.65 < N_n$$

where $N_n$ is an average refractive index of the negative lenses in the first lens group at the d-line.

5. The zoom lens system according to claim 1, further comprising a third lens group that is disposed between said second lens group and an image plane, said third lens group being fixedly positioned during zooming.

6. The zoom lens system, comprising:

a negative first lens group that is movable along an optical axis for zooming, said negative first lens group being closest to an object of any lens group in said zoom lens system;

a positive second lens group that is movable along said optical axis for zooming, said positive second lens group being positioned at an image side of said first negative lens group; and an aperture stop that is an only element positioned between said first and second lens groups, said aperture stop being fixedly positioned during zooming, wherein the zoom lens system satisfies the following relationships:

$$0.7 < (f_t - f_w)/(f_t - f_w) < 1.0 \quad (1)$$

$$0.37 < d_i/f \quad (2)$$

$$0.7 < D_w/f_2 < 1.2 \quad (4)$$

where $f_i$ is a focal length of the entire zoom lens system when the total length of the entire zoom lens system becomes shortest, $f_w$ is the shortest focal length of the entire zoom lens system, $f_t$ is the longest focal length of the entire zoom lens system, $d_i$ is an air gap along the optical axis between the first lens group and the aperture stop when the total length becomes shortest, and $D_w$ is a distance between the aperture stop and a first principal point of the second lens group at a wide extremity.

7. The zoom lens system according to claim 6, wherein said first lens group is moved such that the distance between said first lens group and said aperture stop becomes the smallest at an intermediate position between the wide extremity and the tele extremity, and wherein said second lens group moves such that the distance between said second lens group and said aperture stop decreases gradually as the entire focal length increases.

8. The zoom lens system according to claim 6, wherein said first lens group includes at least two negative lenses and the following relationship is satisfied:

$$1.65 < N_n \tag{5}$$

where $N_n$ is an average refractive index of the negative lenses in the first lens group at the d-line.

9. The zoom lens system according to claim 6, further comprising a third lens group that is positioned between said second lens group and an image plane, said third lens group being fixedly positioned during zooming.

10. The zoom lens system according to claim 1, said zoom lens system consisting of said negative first lens group, said positive second lens group and said aperture stop.

11. The zoom lens system according to claim 6, said zoom lens system consisting of said negative first lens group, said positive second lens group, and said aperture stop.

* * * * *